US009895970B2

(12) United States Patent
Reed, Jr. et al.

(10) Patent No.: US 9,895,970 B2
(45) Date of Patent: *Feb. 20, 2018

(54) MULTI-MODE DRIVE SYSTEM FOR TRANSAXLE APPLICATIONS

(71) Applicant: FCA US LLC, Auburn Hills, MI (US)

(72) Inventors: Richard G Reed, Jr., Royal Oak, MI (US); Joseph E Kubina, Oxford, MI (US); Michael P Kirk, Macomb, MI (US); Donald F Schmanski, Howell, MI (US); Kenneth M Pachucki, Lapeer, MI (US); Mircea Gradu, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 339 days.

This patent is subject to a terminal disclaimer.

(21) Appl. No.: 14/673,123

(22) Filed: Mar. 30, 2015

(65) Prior Publication Data

US 2015/0202959 A1 Jul. 23, 2015

Related U.S. Application Data

(63) Continuation of application No. 13/190,456, filed on Jul. 25, 2011, now Pat. No. 9,731,598.

(Continued)

(51) Int. Cl.
*B60K 17/344* (2006.01)
*B60K 17/346* (2006.01)
*B60K 17/35* (2006.01)

(52) U.S. Cl.
CPC .......... *B60K 17/346* (2013.01); *B60K 17/344* (2013.01); *B60K 17/3505* (2013.01); *Y02T 10/52* (2013.01)

(58) Field of Classification Search
CPC B60K 17/346; B60K 17/344; B60K 17/3505; B60K 17/3462; B60K 17/3467; Y02T 10/52

(Continued)

(56) References Cited

U.S. PATENT DOCUMENTS 1,462,204 A 7/1923 Tobis et al.
3,923,113 A 12/1975 Pagdin
(Continued)

FOREIGN PATENT DOCUMENTS

EP 0204665 A1 12/1986
EP 1518741 A2 3/2005
(Continued)

*Primary Examiner* — Anne Marie M Boehler
(74) *Attorney, Agent, or Firm* — Ralph E. Smith

(57) ABSTRACT

A vehicle drive system capable of selectively providing all-wheel drive and single-driven-axle modes includes a front drive unit having a planetary gearset with a grounded ring gear and a sun gear driven by the transaxle's drive spool via an input shaft, and a differential selectively coupled by a dog clutch to one of the sun gear or the planetary carrier, or neither of them, to thereby selectively provide both an available low range and a front axle disconnect. The front drive unit further defines a power take-off unit with a clutch selectively coupling the input shaft to a propshaft. The rear drive unit includes a planetary gearset with a grounded ring gear, a sun gear driven by the propshaft, and a differential selectively coupled by a dog clutch to one of the sun gear or the planetary carrier, or neither of them, to thereby likewise selectively provide both an available low range and a rear axle disconnect.

15 Claims, 3 Drawing Sheets

Related U.S. Application Data

(60) Provisional application No. 61/367,184, filed on Jul. 23, 2010.

(58) Field of Classification Search
USPC ......... 180/233, 247–249; 475/204, 205, 206, 475/221, 225
See application file for complete search history.

(56) References Cited

U.S. PATENT DOCUMENTS

| | | |
|---|---|---|
| 4,735,110 A | 4/1988 | Altenberg |
| 4,788,886 A | 12/1988 | Nussbaumer et al. |
| 5,728,022 A | 3/1998 | Schultz |
| 6,286,379 B1 | 9/2001 | Yester et al. |
| 6,520,885 B2 | 2/2003 | Gassmann et al. |
| 6,592,488 B2 | 7/2003 | Gassmann |
| 6,752,233 B1 | 6/2004 | Shakespear |
| 6,814,682 B2 | 11/2004 | Spitale |
| 6,849,017 B2 | 2/2005 | Nett |
| 6,851,501 B2 | 2/2005 | Gassmann |
| 6,905,436 B2 | 6/2005 | Mueller et al. |
| 6,932,204 B2 | 8/2005 | Dolan |
| 6,945,899 B2 | 9/2005 | Peura |
| 6,958,030 B2 | 10/2005 | DeGowske |
| 6,974,400 B2 | 12/2005 | Williams |
| 7,004,874 B2 | 2/2006 | Mizon et al. |
| 7,022,041 B2 | 4/2006 | Valente |
| 7,059,992 B1 | 6/2006 | Bowen |
| 7,083,539 B2 | 8/2006 | Bowen |
| 7,150,694 B2 | 12/2006 | Mizon et al. |
| 7,156,766 B2 | 1/2007 | Gassmann |
| 7,189,179 B2 | 3/2007 | Williams et al. |
| 7,207,409 B2 | 4/2007 | Downs |
| 7,232,399 B2 | 6/2007 | Valente |
| 7,247,118 B2 | 7/2007 | Haruki et al. |
| 7,338,404 B2 | 3/2008 | Gassmann et al. |
| 7,354,373 B2 | 4/2008 | Abiru et al. |
| 7,361,113 B2 | 4/2008 | Puiu et al. |
| 7,442,143 B2 | 10/2008 | Gassmann et al. |
| 7,611,437 B2 | 11/2009 | Valente |
| 7,628,241 B2 | 12/2009 | Miura |
| 7,641,581 B2 | 1/2010 | Yamazaki |
| 7,658,692 B2 | 2/2010 | Engelmann et al. |
| 7,686,724 B2 | 3/2010 | Capito et al. |
| 7,713,158 B2 | 5/2010 | Gassmann et al. |
| 7,713,159 B2 | 5/2010 | Hirota et al. |
| 8,172,712 B2 | 5/2012 | Jarzyna et al. |
| 8,177,672 B2 | 5/2012 | Kato et al. |
| 2003/0171182 A1 | 9/2003 | Peura |
| 2004/0231944 A1 | 11/2004 | Dolan |
| 2006/0037803 A1 | 2/2006 | Mori |
| 2007/0084660 A1 | 4/2007 | Downs |
| 2007/0155571 A1 | 7/2007 | Nett et al. |
| 2007/0191170 A1 | 8/2007 | Valente |
| 2007/0238567 A1 | 10/2007 | Hirota et al. |
| 2008/0300101 A1 | 12/2008 | Jarzyna et al. |
| 2009/0019966 A1 | 1/2009 | Valente |
| 2009/0160274 A1 | 6/2009 | Aikawa et al. |
| 2009/0235780 A1 | 9/2009 | Zink |
| 2009/0277711 A1 | 11/2009 | Hoffmann et al. |
| 2010/0038164 A1 | 2/2010 | Downs et al. |
| 2010/0044138 A1 | 2/2010 | Marsh et al. |
| 2010/0062891 A1 | 3/2010 | Ekonen et al. |
| 2010/0094519 A1 | 4/2010 | Quehenberger et al. |
| 2010/0120570 A1 | 5/2010 | Capito et al. |
| 2012/0083380 A1* | 4/2012 | Reed .................... B60K 17/344 475/205 |

FOREIGN PATENT DOCUMENTS

| | | |
|---|---|---|
| EP | 1518741 B1 | 8/2008 |
| WO | 2008048390 A1 | 4/2008 |
| WO | 2008124426 A1 | 10/2008 |
| WO | 2008144177 A1 | 11/2008 |
| WO | 2009014884 A2 | 1/2009 |
| WO | 2009042314 A1 | 4/2009 |
| WO | 2009100187 A2 | 8/2009 |

* cited by examiner

MULTI-MODE DRIVE SYSTEM FOR TRANSAXLE APPLICATIONS

CROSS-REFERENCE TO RELATED APPLICATIONS

This application is a continuation of application Ser. No. 13/190,456 filed Jul. 25, 2011, which claims benefit of provisional application No. 61/367,184 filed Jul. 23, 2010; the disclosure of each of these applications is incorporated herein by reference.

FIELD OF THE INVENTION

In a conventional front-wheel-drive vehicle, both the engine and the transmission assembly are typically transversely oriented in the vehicle. A transaxle combines the functionality of the transmission, a front differential and a front drive axle into one integrated assembly.

Where all-wheel drive (AWD) functionality is desired in a vehicle equipped with a transaxle, the transaxle is modified to incorporate a power take-off unit (PTU), for example, a hypoid gear arrangement driven simultaneously with the front differential, to feed power via a longitudinally-oriented propshaft to a rear differential which, in turn, powers the rear axle. In our U.S. Patent Application Publication No. 2008/0300101, we disclose a first vehicle drive system in which the PTU's hypoid ring gear is operatively coupled for rotation with the front differential's outer case, and in which the front axle assembly or "front drive unit" further incorporates reduction gearing in the form of a planetary gear set disposed upstream of both the front differential and the hypoid gear set. The reduction gear set is controlled by a sliding reduction hub to provide, as an input to both the front differential and the PTU's hypoid gear, a selected one of a normal or "high" range, and a "low" range characterized by a speed reduction and attendant increase in provided torque. In a third position, the reduction hub defines a "neutral" condition in which both the front differential and the PTU's hypoid gear/propshaft are decoupled from the reduction gear set and, hence, from the engine and transmission output.

In this manner, the front and rear axles of the preferred AWD system disclosed in our U.S. Patent Application Publication No. US2008/0300101 are identically driven in each of the drive system's three operating modes—"high" range, "low" range, and "neutral"—as determined by the selected position of the reduction hub controlling the front axle assembly's reduction gearing, with the available "low" range providing improved "off-road" performance improving vehicle, and with the available "neutral" condition facilitating vehicle towing. However, it will be appreciated that, with this design, the hypoid gearset forming the transaxle's PTU, the propshaft, and such additional components including any associated clutch and the corresponding gearset of the rear drive assembly, must be appropriately sized to accommodate the higher operating torques generated when the front axle's planetary gear set is placed in "low" range.

SUMMARY OF THE INVENTION

It is an object of the invention to provide a vehicle equipped with a transaxle and PTU with additional operating modes, for example, to improve fuel efficiency and reduce perceived vehicle NVH when only a single driven axle is deemed necessary or desired, by disconnecting a selected one of the front and rear axles.

It is another object of the invention to disconnect power to the PTU's hypoid gearing, the propshaft and the rear differential in a transaxle-equipped AWD vehicle when powering only the front axle, to thereby avoid the unnecessary power loss and component wear associated with the idling of such driveline components.

It is a further object of the invention to include selectable reduction gearing in the rear drive unit of a transaxle-equipped AWD vehicle, to thereby permit the PTU, propshaft and related components to be sized to accommodate the relatively lower operating torques associated with normal or "high" range operation, notwithstanding driving both front and rear axles in the "low" range.

In accordance with an aspect of the invention, an all-wheel drive system for a vehicle includes a first drive unit having a first housing, a first input shaft, and a first planetary gearset having a first ring gear grounded to the first housing, a first sun gear permanently coupled for rotation with the first input shaft, and a set of first planet gears supported by a first planetary carrier. The first drive unit also includes a first differential, and a first clutch for selectively coupling the first differential for rotation with one of the first sun gear and the first planetary carrier. The all-wheel drive system further includes a second drive unit having a second housing, a second input shaft, and a second planetary gearset having a second ring gear grounded to the second housing, a second sun gear permanently coupled for rotation with the second input shaft, and a set of second planet gears supported by a second planetary carrier. The second drive unit also includes a second differential, and a second clutch for selectively coupling the second differential for rotation with one of the second sun gear and the second planetary carrier. The all-wheel drive system further includes a power take-off unit with a third clutch selectively coupling the second input shaft of the second drive unit to the first input shaft of the first drive unit.

In accordance with another aspect of the invention, the first clutch is further adapted to selectively decouple the first differential from both the first sun gear and the first planetary carrier. Similarly, in a preferred embodiment, the second clutch is further adapted to selectively decouple the second differential from both the second sun gear and the second planetary carrier. In this manner, the invention advantageously provides for the selective driving of either one, or both, of the axles while further allowing the simultaneous disconnect of each axle to facilitate towing of the vehicle without damage to driveline components. While the invention contemplates use of any suitable clutch, in a preferred embodiment, the first and second clutches are each three-position dog clutches.

In accordance with another aspect of the invention, to provide each driven differential (axle) with a "low" range, the first and second planetary gearsets preferably achieve a reduction ratio of between about 2.5:1 to about 4.5:1 when the first and second clutches respectively couple the first and second differentials to the respective carriers of the first and second planetary gearsets. Alternatively, in the event that a more moderate torque multiplication is desired, for example, in order to provide the vehicle with greater towing capacity, one or both of the planetary gearsets preferably achieve a reduction ratio of between about 1.25:1 to about 1.5:1 when its respective differential is coupled to its planetary carrier.

In accordance with yet a further aspect of the invention, wherein the first input shaft is driven by a final spool drive of a transaxle rotatable about a first axis, and wherein the power take-off unit includes a further including a jack shaft rotatable about a second axis, the second axis being disposed at a nominal height in the vehicle lower than that of the first axis.

Other objects, features, and advantages of the present invention will be readily appreciated upon a review of the subsequent description of the preferred embodiment and the appended claims, taken in conjunction with the accompanying Drawings.

DETAILED DESCRIPTION OF THE PREFERRED EMBODIMENT

Figure 1:
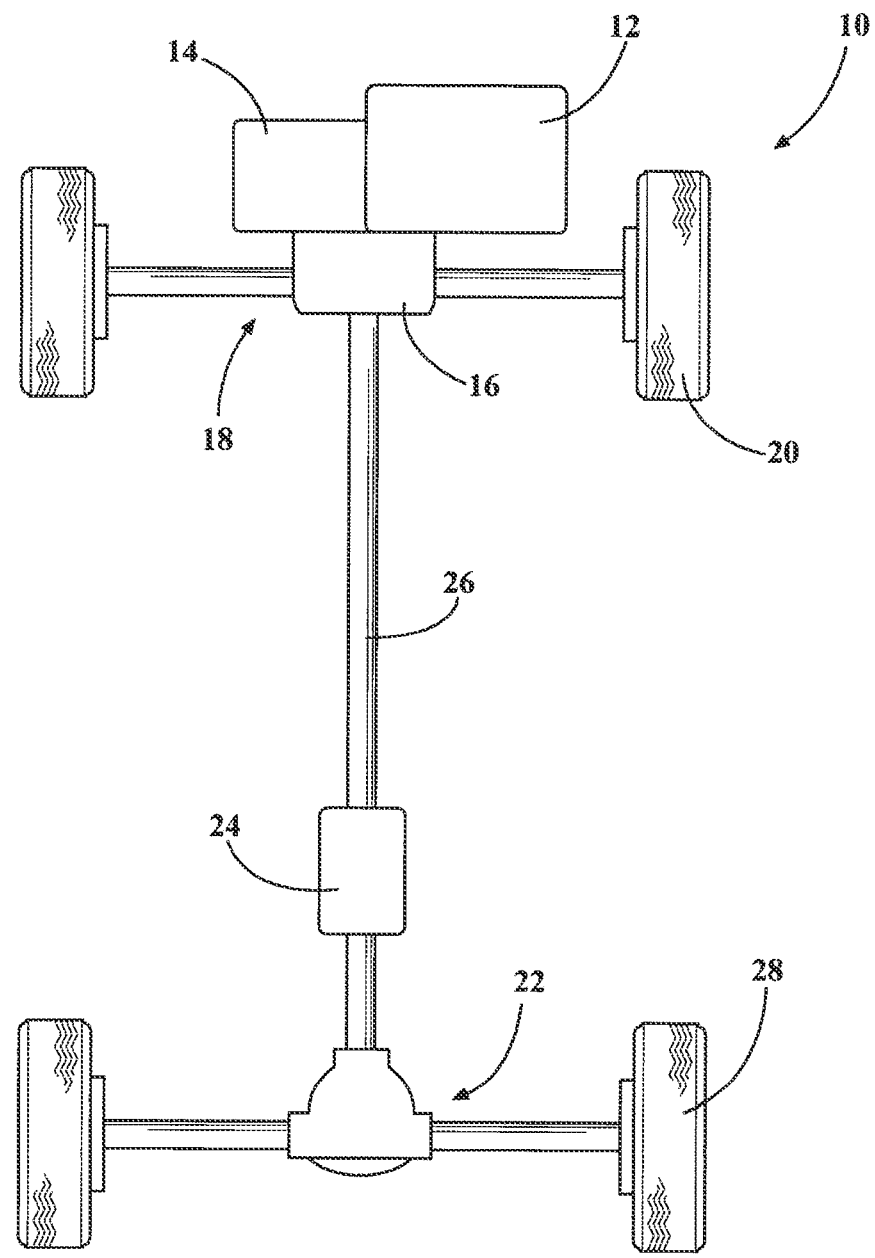
FIG. 1 is a diagrammatic view of an exemplary multi-mode drive system for a vehicle equipped with a transaxle.

Referring to FIG. 1, an exemplary multi-mode drive system 10 for a vehicle equipped with a transversely-mounted engine 12 includes a transaxle 14 having a power transfer unit or power take-off unit (PTU 16") through which power is fed to a front axle assembly or front drive unit (FDU 18") to drive the vehicle's front wheels 20. The PTU 16 also selectively feeds power through to a rear drive unit ("RDU 22") through an electrically-controlled clutch 24 via a generally-longitudinally-extending propshaft 26 to thereby drive the vehicle's rear wheels 28.

Figure 2:
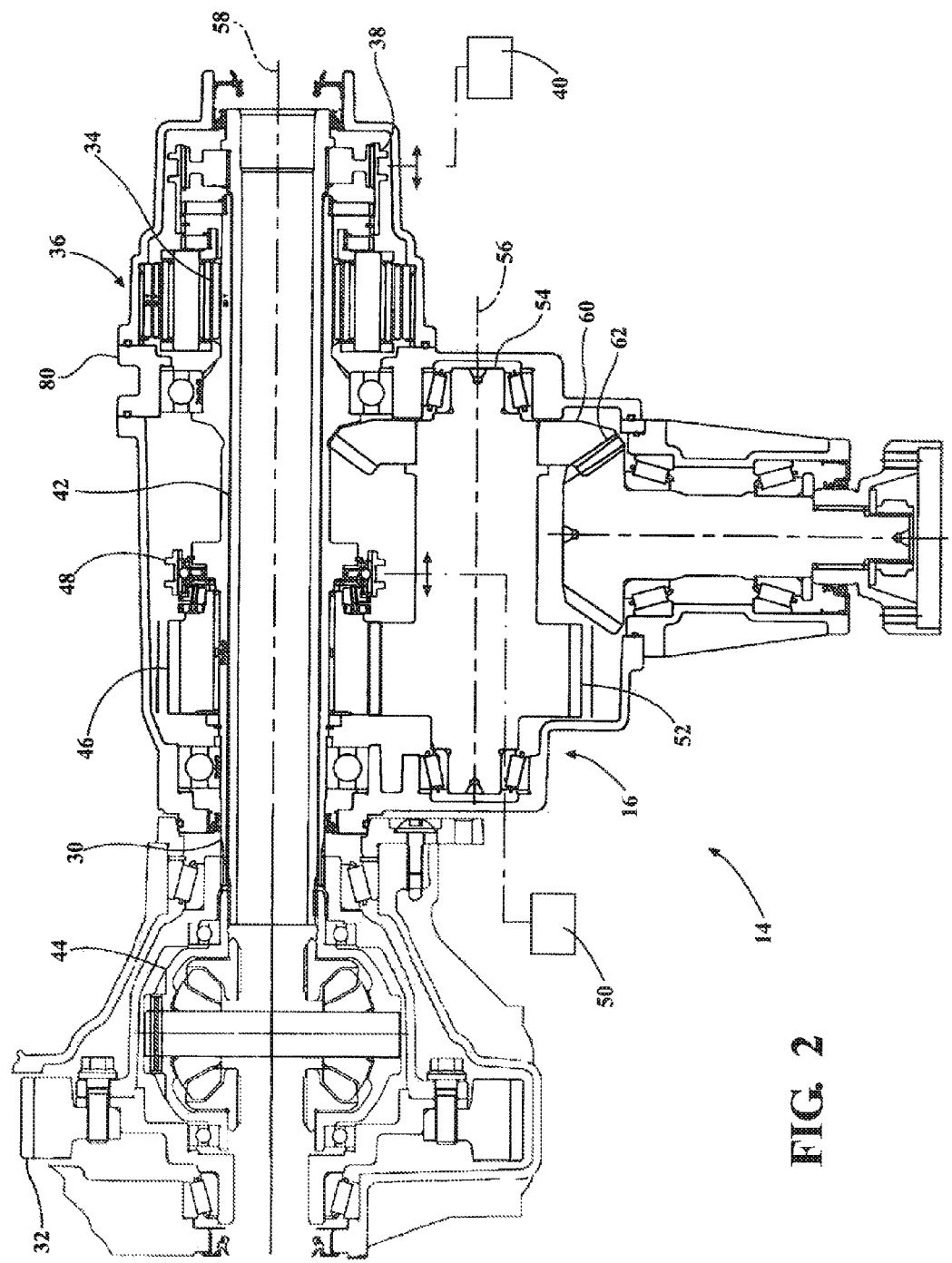
FIG. 2 is a partial sectional view of the transaxle of FIG. 1 showing a first reduction gear set located in the torque flowpath downstream of the hypoid gearset forming the transaxle's PTU and upstream of the front axle assembly's floating front differential.

More specifically, and referring to FIG. 2, the transaxle 14 includes an intermediate shaft 30 that receives power from the transaxle's final drive spool 32. The intermediate shaft 30 is coupled for rotation with the sun gear 34 of a first planetary gearset 36 forming the FDU's reduction gear set. A first, three-position dog clutch 38, operated by a first linear actuator shown diagrammatically at 40, is movable between a first position (toward the left in FIG. 2) in which the first clutch 38 couples a nested output shaft 42 to the planetary carrier to thereby achieve a predetermined speed reduction/torque multiplication. The first clutch 38 is also movable to a second, intermediate position (as illustrated in FIG. 2) in which the first clutch 38 does not couple the intermediate shaft 30 to the output shaft 42 to thereby achieve a "neutral" condition or disconnected front axle. The first clutch 38 is also movable to a third position (toward the right in FIG. 2) in which the first clutch 38 rotationally couples the output shaft 42 directly to the intermediate shaft 30. The output shaft 42 is, in turn, rotationally coupled to the outer case of the FDU's floating front differential 44 which is supported within the transaxle's final drive spool 32.

The availability of these three front axle operating modes allows the vehicle to retain its nominal transmission ratios, for example, for normal vehicle operation on paved roads, thus increasing fuel economy, while also providing the ability to select low-range gearing for off-road driving applications (for example, when the first planetary gearset 36 achieves a reduction ratio of between about 2.5:1 to about 4.5:1) or alternatively to improve trailer-towing capacity (for example, when the first planetary gearset 36 achieves a reduction ratio of perhaps about 1.25:1 to about 1.5:1).

Referring again to FIG. 2, the FDU's intermediate shaft 30 is also selectively coupled to a first gear 46 forming part of the exemplary drive system's PTU 16 by a second, two-position clutch 48 operated by a suitable second linear actuator indicated schematically at 50. When coupled for rotation with the intermediate shaft 30 by operation of the second clutch 48, the first gear 46 mates with a second gear 52 to drive a jack shaft 54 whose rotational axis 56 is slightly lower than the rotational axis 58 of the intermediate shaft 30, to improve the compactness of the resulting PTU 16. A first hypoid gear 60 on the jack shaft 54 drives a second hypoid gear 62 which, in turn, drives the vehicle's propshaft (shown diagrammatically in FIG. 1).

Figure 3:
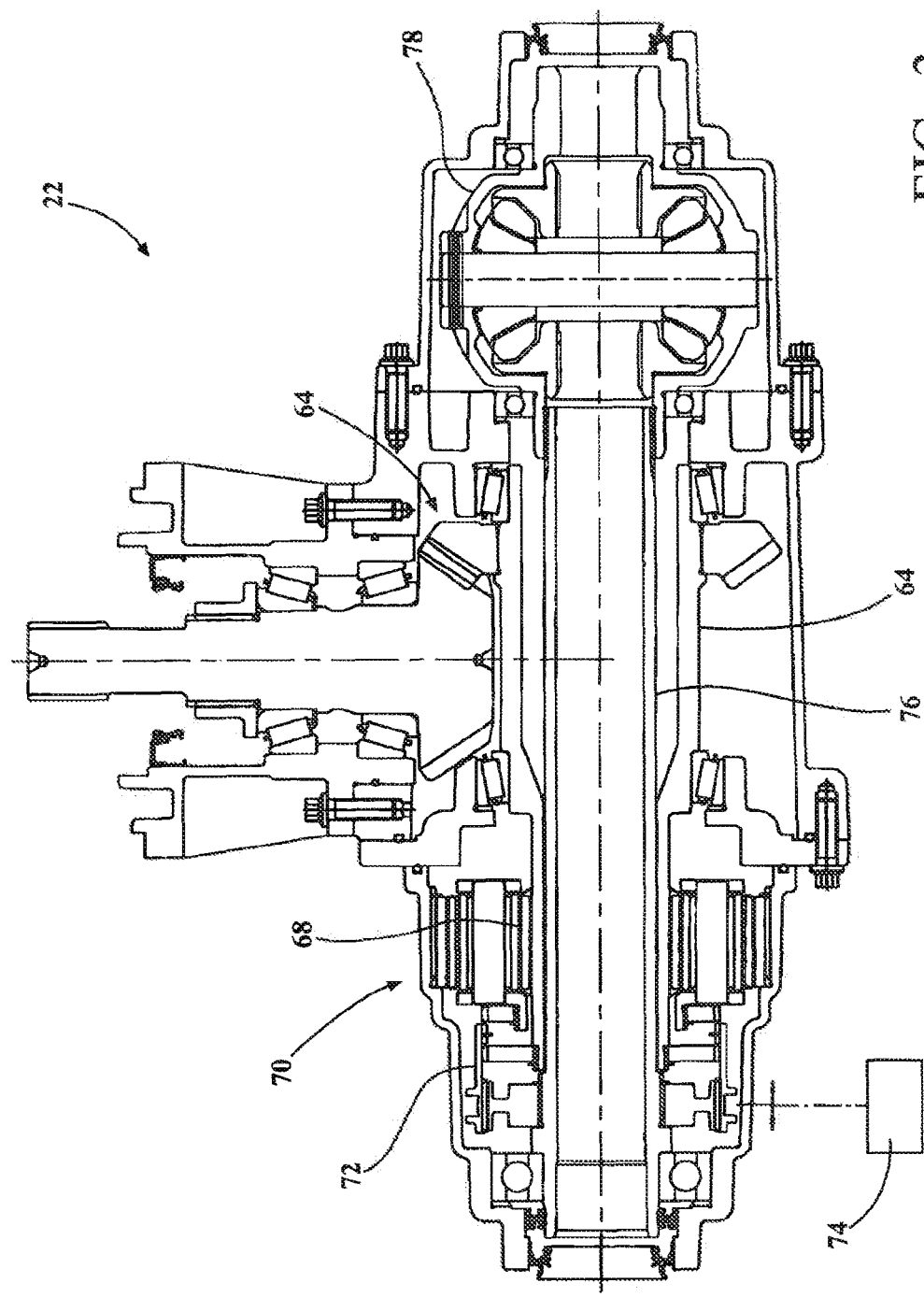
FIG. 3 is a partial sectional view of the rear axle of FIG. 1, downstream of the propshaft and clutch, showing the rear differential as selectively driven by a second reduction gearset located in the rear axle assembly.

Referring to FIG. 3, the exemplary system's RDU 22 includes a second hypoid gearset 64 whose gears are preferably similar to, but nonetheless intentionally slightly mismatched from, the PTU's hypoid gears 60, 62. The second hypoid gearset 64 drives an outer shaft 66 that is itself coupled for rotation with the sun gear 68 of a second planetary gearset 70 forming the RDU's reduction gear set. A third, three-position dog clutch 72, similar in construction to the transaxle's first clutch 38 and operated by a third linear actuator shown diagrammatically at 74, is similarly movable to a first position (toward the left in FIG. 3) in which the third clutch 72 rotationally couples the outer shaft 66 directly to a nested inner shaft 76. The third clutch 72 is also movable to a second, intermediate position (as illustrated in FIG. 3) in which the third clutch 72 does not couple the outer shaft 66 to the inner shaft 76 to thereby achieve a "neutral" condition or disconnected rear axle. The third clutch 72 is also movable to a third position (toward the right in FIG. 3) in which the third clutch 72 couples the inner shaft 76 to the carrier of the second planetary gear set 70, to thereby achieve a predetermined speed reduction/torque multiplication. The inner shaft 76 is, in turn, rotationally coupled to the outer case of the RDU's floating differential 78. It will be appreciated that the invention contemplates use of a limited-slip differential in place of the open differential 78 illustrated in FIG. 3.

Referring again to FIG. 2, while the invention contemplates use of any suitable two-position clutch 48 for selectively driving the first gear 46 under the control of the second actuator 50, in the exemplary drive system 10, the two-position clutch 48 incorporates a synchronizer friction cone by which to bring the downstream driveline up to speed to allow engagement of the RDU's dog clutch 72.

It will be noted that, in the exemplary drive system 10, the FDU's reduction gearing 36 is advantageously disposed within the same housing 80 as the PTU's jack shaft 54 and hypoid gearset 60, 62; thus, the invention contemplates the characterization that the PTU 16 itself includes reduction gearing, provided that the reduction gearing is "downstream" of the hypoid gearset 60, 62, and upstream of the front axle's differential 44.

From the foregoing, it will be appreciated that the use of reduction gearing in both the front and rear axles in accordance with the invention advantageously provides a lower driveline loading, with the PTU gearing, propshaft, electric-controlled clutch, and the RDU gears all subjected to significantly lower torque than when fed torque directly from a planetary reduction gear set disposed "upstream" of the PTU.

In accordance with another aspect of the invention, the transaxle 14 and RDU 22 are preferably designed for easy manufacture, with myriad components such as the respective reduction gearsets and dog clutch actuators preferably being common to both units. Thus, in the exemplary drive system 10, both the PTU 16 and the RDU 22 utilize a common right-angle hypoid gear design, while the transaxle 14 and the RDU 22 advantageously utilize the same planetary gearset and dog clutch design. In this manner, it will be appreciated that the shift actuation for the reduction gearsets of the exemplary drive system's transaxle 14 and RDU 22 are likewise preferably identical, as is the disconnect actuation for the PTU's hypoid gear set 60, 62.

While the above description constitutes the preferred embodiment, it will be appreciated that the invention is susceptible to modification, variation and change without departing from the proper scope and fair meaning of the subjoined claims.

What is claimed is:

1. An all-wheel drive system for a vehicle comprising:
   a front drive unit including:
      a front housing,
      a front input shaft,
      a front planetary gearset having a front ring gear grounded to the front housing, a front sun gear permanently coupled for rotation with the front input shaft, and a set of front planet gears supported by a front planetary carrier,
      a front differential, and
      a front clutch configured to selectively couple the front differential for rotation with one of the front sun gear and the front planetary carrier;
   a rear drive unit including:
      a rear housing,
      a rear input shaft,
      a rear planetary gearset having a rear ring gear grounded to the rear housing, a rear sun gear permanently coupled for rotation with the rear input shaft, and a set of rear planet gears supported by a rear planetary carrier,
      a rear differential, and
      a rear clutch configured to selectively couple the rear differential for rotation with one of the rear sun gear and the rear planetary carrier independently of the front clutch coupling the front differential for rotation with one of the front sun gear and the front planetary carrier; and
   a propshaft coupled to the front drive unit via a power take-off unit and to the rear drive unit;
   wherein a two-position clutch of the power take-off unit is configured to selectively couple the rear input shaft to the front input shaft such that the all-wheel drive system is configured to provide a front wheel drive only mode, a rear wheel drive only mode and an all-wheel drive mode, and wherein in the front wheel drive only mode, the two-position clutch decouples the power-take-off unit from the front input shaft such that power is disconnected from the power take-off unit, propshaft and rear drive unit.

2. The all-wheel drive system of claim 1, wherein the propshaft comprises an electronically controlled clutch.

3. The all-wheel drive system of claim 1, wherein the power-take-off unit comprises:
   a first gear;
   a second gear mating with the first gear;
   a jack shaft configured to be driven by the second gear;
   a first hypoid gear associated with the jack shaft; and
   a second hypoid gear configured to be driven by the first hypoid gear.

4. The all-wheel drive system of claim 3, wherein the two-position clutch is configured to selectively couple the rear input shaft of the rear drive unit to the front input shaft unit by selectively coupling the first gear for rotation with the front input shaft; and
   wherein driving the second hypoid gear drives the propshaft.

5. The all-wheel drive system of claim 1, wherein the two-position clutch of the power take-off unit comprises a synchronizer friction cone, and wherein the rear clutch is engaged after the two-position clutch to thereby bring the rear input shaft up to speed prior to engagement of the rear clutch.

6. The all-wheel drive system of claim 1, wherein the front input shaft is driven by a final spool drive of a transaxle rotatable about a first axis, and wherein the jack shaft of the power take-off unit is rotatable about a second axis, the second axis being disposed at a nominal height in the vehicle lower than that of the first axis thereby providing a compact power take-off unit.

7. The all-wheel drive system of claim 1, wherein the front clutch is further configured to selectively decouple the front differential from both the front sun gear and the front planetary carrier independent of the rear differential.

8. The all-wheel drive system of claim 7, wherein the front clutch comprises a front three-position clutch.

9. The all-wheel drive system of claim 8, wherein the three-position clutch comprises:
   a first position coupling a nested output shaft to the front planetary carrier to provide a predetermined torque multiplication, wherein the output shaft is coupled to the front differential;
   a second position decoupling the front input shaft from the output shaft thereby providing a neutral condition; and
   a third position rotationally coupling the front input shaft directly to the output shaft.

10. The all-wheel drive system of claim 7, wherein the front clutch comprises a front three-position dog clutch.

11. The all-wheel drive system of claim 1, wherein the front planetary gearset achieves a reduction ratio of between about 2.5:1 to about 4.5:1 when the front differential is coupled by the front clutch to the front planetary carrier.

12. The all-wheel drive system of claim 11, wherein the rear planetary gearset substantially achieves the reduction ratio when the rear differential is coupled by the rear clutch to the rear planetary carrier.

13. The all-wheel drive system of claim 1, wherein the front planetary gearset achieves a reduction ratio of between about 1.25:1 to about 1.5:1 when the front differential is coupled by the front crutch to the front planetary carrier.

14. The all-wheel drive system of claim 1, wherein the rear clutch is further configured to selectively decouple the rear differential from both the rear sun gear and the rear planetary carrier independent of the front differential.

15. The all-wheel drive system of claim 14, wherein the rear clutch comprises a rear three-position dog clutch.

* * * * *